Oct. 31, 1961     O. C. HOLBROOK     3,006,411
SURFACTANT-WATER SECONDARY RECOVERY PROCESS
Filed March 31, 1958     2 Sheets-Sheet 1
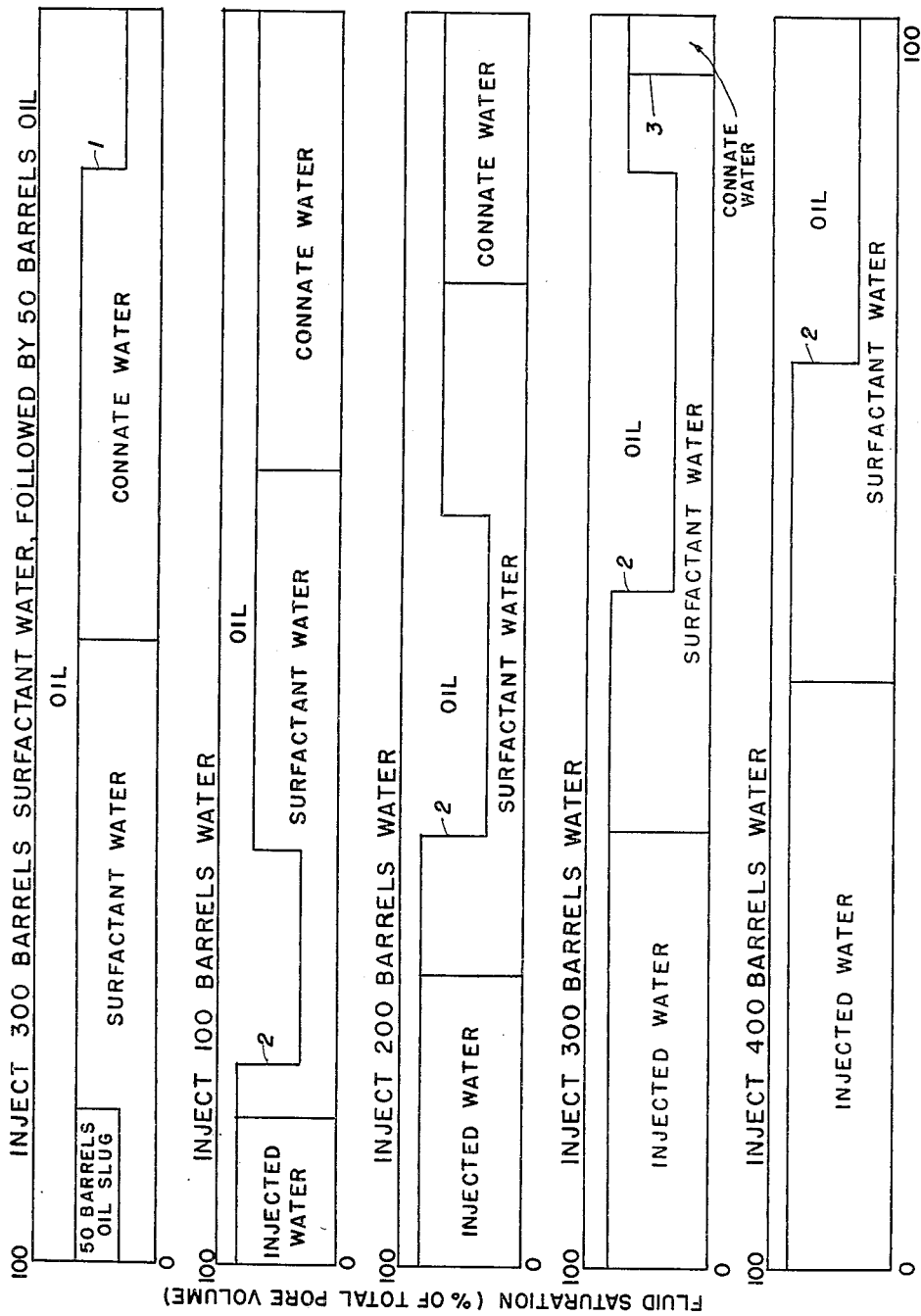
FIG. 1    DISTANCE FROM INJECTION WELL (FEET)
INVENTOR.
ORRIN C. HOLBROOK
BY Edward H. Lang
ATTORNEY.

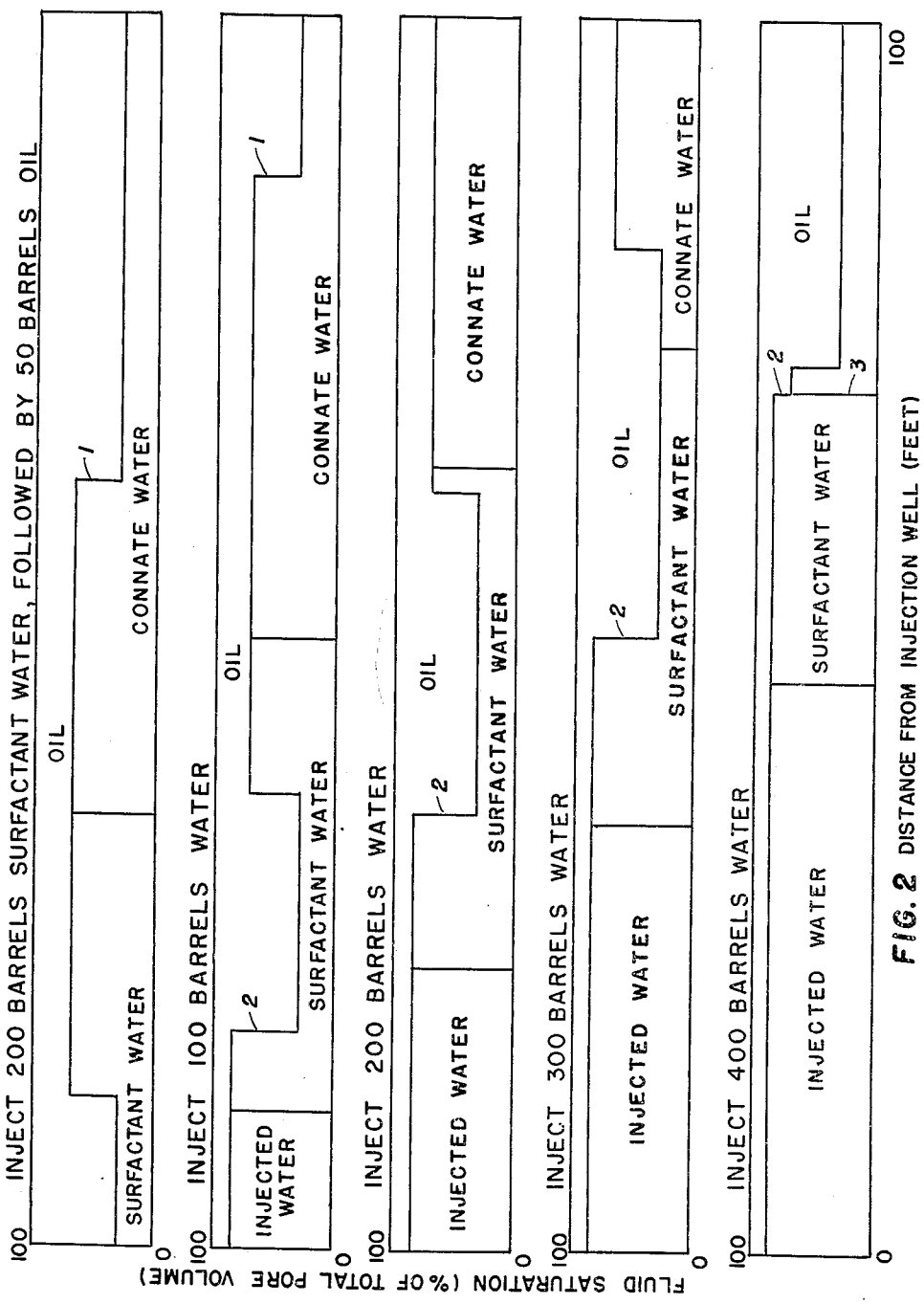

United States Patent Office 3,006,411
Patented Oct. 31, 1961

3,006,411
SURFACTANT-WATER SECONDARY
RECOVERY PROCESS
Orrin C. Holbrook, Crystal Lake, Ill., assignor to The
Pure Oil Company, Chicago, Ill., a corporation of
Ohio
Filed Mar. 31, 1958, Ser. No. 724,941
7 Claims. (Cl. 166—9)

This invention relates to the recovery of petroleum oil from reservoirs beneath the earth's surface, and is more particularly concerned with a flooding method for recovering such oil in greater amounts than is possible by conventional flooding methods.

It is well known in the flooding of depleted oil reservoirs to inject into the reservoir a surfactant to aid in the release of the oil from the formation. Various types of surfactants have been used for this purpose, such as those disclosed in Reissue Patent No. 23,360, Patent Nos. 2,800,962; 2,233,382; and 2,765,851.

Conventional water-flooding leaves about 20–50% of the original oil in the reservoir, even after prolonged flooding. By adding surfactants to the flood water, an additional 50% of the oil in place can be recovered. The difficulty with conventional methods of flooding using surfactants is that the injected water containing surfactant displaces the connate water and builds up a bank of connate water ahead of it. Therefore, the water at the advancing water-oil flood-front interface is always connate water. When the connate-water bank floods out a given area in the reservoir formation, it causes the oil in place to become discontinuous and the continuity of the oil phase cannot be restored even in the presence of surfactant in the flood water.

My invention resides in the discovery that by injecting a slug of oil after injection of a slug of surfactant-containing water, and then flooding with ordinary water, a continuous oil phase is formed ahead of a second flood-front at the interface of the surfactant solution and injected oil, resulting in removal of additional quantities of oil.

It is an object of this invention to provide an improved method for secondary recovery of oil from underground reservoirs. Another object of this invention is to provide a method for recovering a higher percentage of the oil present in an oil reservoir. Other objects of the invention will manifest themselves from the following description and accompanying drawing, of which FIGURES 1 and 2 are graphic illustrations of the invention.

In carrying out my invention, after the oil in the reservoir has been produced by conventional methods until the rate of production is no longer economical, from 0.3 to 3 pore volumes of an aqueous surfactant solution, containing approximately 0.01 to 1% of a suitable surfactant, is injected into the reservoir. The surfactant may be a perfluoro-acid such as perfluorobutyric, perfluorocaprylic, and perfluorodecanoic acid, or other organic perfluoro compounds disclosed in Patent No. 2,765,851; a fatty acid soap such as sodium oleate, sodium laurate, or sodium palmitate; a polyglycol ether derived by reacting an alkylene oxide with a hydroxylated fatty acid, such as disclosed in Patent No. 2,233,-382; and salts of fatty or sulfonic acids, such as disclosed in Reissue Patent No. 23,360. Other suitable surfactants which may be used are the water-soluble polyoxylene compounds, namely, polyoxylene sorbitan laurates, palmitates, stearates, oleates, and alcohols marketed under the trade names "Tween 20," "40," "60," and "80," "Brij 35," "G–2149," "G–2151," "G–2152," and "G–2153," as well as the polyoxylene esters of mixed fatty and resin acids marketed under the name "Renex."

These products are all manufactured by Atlas Powder Company and their properties have been published in a brochure entitled "Atlas Surface Active Agents," published in 1948. It is important to inject the proper amount of surfactant-containing water in order to get the desired results. If too little water containing surfactant is injected, the connate water-oil front will, because of the speed with which it travels, advance ahead of the injected surfactant-containing water front, with the result that the surfactant will not be effective. It is important, therefore, to determine the minimum amount of surfactant-containing water to be injected ahead of the flood water.

In order to illustrate what happens in conventional flooding, a core from Elgin sandstone was flooded to residual (unrecovable) oil saturation with water to which no surfactant had been added and which had an interfacial tension with the oil of 30 dynes/cm. After the flooding, the residual oil saturation was 48.2% of the oil initially in place. This same core, after again being saturated with water followed by oil saturation, was flooded with water containing 0.1% by weight of perfluorobutyric acid as a surfactant so that the water had an interfacial tension of 1.5 dynes at the flood-front. After flooding with this water, the residual oil saturation was 27.5% of the original oil in place. When the same core was flooded with several pore volumes of the water giving a water-oil interfacial tension of 30 dynes/cm., followed with several pore volumes of the surfactant-containing water giving a water-oil interfacial tension of 1.5 dynes/cm., the residual oil saturation was 46%, thus illustrating the profound effect of the conditions at the flood-front on residual oil saturation. Very little additional oil was recovered by flooding with fresh water followed by surfactant-containing water.

In accordance with my invention, a sufficient quantity of surfactant-containing water must be injected to establish a fairly wide band of surfactant-containing formation prior to injection of the slug of oil. The oil slug will amount to about 0.01 to 0.1 pore volume of the formation to be flooded. When the leading edge of the oil slug reaches any given point in the formation, it reduces the water saturation to a low value and reestablishes continuity of the oil phase. The trailing edge of the oil slug forms a second flood-front, but the water at this second flood-front contains surfactant. The residual oil saturation after this second front has passed is lower than after conventional water-flooding, or ordinary surfactant-containing water flooding, because of the presence of the surfactant at the flood-front.

It has previously been pointed out that there is a critical lower limit on the amount of surfactant solution that must be injected ahead of the oil slug. This is illustrated graphically in FIGURES 1 and 2 for a particular formation 100 feet long and having a total pore volume of 1000 bbl. FIGURE 1 contains 5 graphs showing the percentage saturations of oil, connate water, injected surfactant water, and injected flood water throughout the length of a reservoir at five different stages in the process of this invention. The reservoir is 100 feet long, has a pore volume of 1,000 bbl., and initially contains 300 bbl. of connate water and 700 bbl. of oil. If depicted in the initial condition, the graph of the reservoir would show a horizontal line at the 30% saturation level, representing 30% connate water and 70% oil dispersed throughout the length of the reservoir. FIGURE 1 shows the percentage saturation throughout the reservoir when the process of this invention is carried out using 300 barrels of surfactant water and 50 bbl. of injected oil. FIGURE 2 depicts the treatment of the same reservoir under the same conditions, except that only 200 bbl. of surfactant water is used. It has previously been pointed out that there is a critical lower limit on the amount of surfactant water which should be injected ahead of the oil slug. FIGURES 1 and 2 illustrate the criticality of the lower limit of the quantity of the surfactant water injected, as will subsequently appear.

The first of the 5 graphs of each figure depicts the percentage reservoir saturation after the injection of the surfactant water and the crude oil slug. The surfactant water is shown to have displaced the connate water which was initially uniformly distributed throughout the length of the reservoir. The connate water in turn has replaced a portion of the oil which coexisted with the connate water. An advancing flood-front exists at the interface 1 between the reservoir oil and the connate water bank. This and other interfaces in the graph are shown by straight lines, but it will be understood that where such interfaces exist they are usually irregular and not well defined. The water which replaces reservoir oil at the flood-front interface is connate water, and not the injected surfactant water, as would be desired to enhance oil recoveries. Behind interface 1 the connate water has become the continuous phase, and the oil saturation of the reservoir behind this interface has been reduced and the oil has become discontinuous. A second rather poorly defined interface exists between the connate water and the injected surfactant water, and a third interface exists between the surfactant water and the injected oil slug. The portion of the reservoir which has been reached by the oil slug is driven to residual water saturation, and oil is the predominant and continuous phase in this region of the reservoir.

The remaining graphs in both FIGURES 1 and 2 show the conditions existing in the reservoir after progressively greater quantities of flood-water have been injected. Upon the commencement of injection of flood-water after the injection of the oil slug, the condition of the reservoir is very much the same as it was at the beginning of the process when surfactant water was first injected. That is, in the zone surrounding the injection well oil is the predominant and continuous phase, and water is the discontinuous phase. However, the water which co-exists with the oil around the injection well is surfactant containing water, not connate water. As flood-water is then injected into the reservoir, the flood-water replaces the surfactant water in a manner analogous to that in which the initially injected surfactant water replaced connate water and built up a bank of connate water, which bank existed behind the interface 1 between the reservoir oil and the connate water. Similarly an interface 2 exists between oil in the continuous oil phase zone adjacent the injection well and the surfactant water which co-existed with this oil prior to the injection of flood-water. As the injection of water progresses, the bank of surfactant water which builds up behind the zone of continuous oil increases in length to form a surfactant water bank, in a manner exactly analogous to that in which the connate water bank was produced. Since the interface 2 is between oil and surfactant containing water, the residual oil saturation in the reservoir behind this interface is substantially less than that which existed behind the reservoir oil and connate water interface. As the bank of continuous oil progresses through the reservoir it increases in size because a greater quantity of oil is produced by the surfactant water than was produced by the connate water. Eventually this oil bank reaches the producing well, and when the interface 2 has reached the producing well the process is terminated.

A situation favorable to increase production of oil, in accordance with the invention, is illustrated in FIGURE 1, where 300 bbl. of surfactant water was used. However, where only 200 barrels of surfactant water was used, as shown in FIGURE 2, the potentialities of the process are not fully obtained for the reason that the growing bank of surfactant water behind interface 2 will reach a volume greater than 200 bbl. before the interface 2 reaches the producing well at the end of the reservoir. At this point, the interface between the second continuous oil zone and the surfactant water, becomes in fact an interface between continuous oil and connate water. Thus, in the terminal portion of the reservoir, the advantage of the process of this invention is lost. Surfactant water behind the flood front is ineffective to recover additional quantities of oil where connate water exists behind interface 2. This is because the continuity of the oil phase has been destroyed by the connate water before the surfactant water reaches that portion of the reservoir.

As a specific example of the invention, the linear reservoir 100 ft. long and containing 700 bbl. of oil and 300 bbl. of connate water, is flooded with 300 bbl. (0.3 pore volume) of water containing 0.01% by weight of perfluorobutyric acid as the surfactant, followed by a slug of 0.05 pore volume of oil previously produced from the formation, and then water-flooded with fresh water at a pressure of 100 lb./sq. in. There is produced from the formation 550 bbl. of oil, representing a recovery of approximately 80% of the residual oil, as against 400 bbl. of oil which could be expected by conventional flooding.

In general, the amount of surfactant solution which will be required will vary inversely with the oil saturation of the formation within the limits of about 0.2 to 0.3 pore volume. The amount of oil which is required to form an oil bank behind the surfactant bank is not critical. Amounts within the range of 0.01 to 0.1 pore volume have been found to be effective.

The amount of surfactant solution which is required in accordance with my invention may be experimentally determined by water-saturating a core from the formation and then resaturating the core with oil so that the core contains both water and oil saturation. Since the volume of oil in the core is known, the amount of a surfactant solution which will be required to extract the maximum amount of oil can be determined by trial experiments.

In the event is is not desired to determine empirically the minimum amount of surfactant solution required, the surfactant solution can be injected in the formation until it appears at a producing well and the oil slug then injected. This will insure that the oil bank will not get ahead of the surfactant bank prior to the time it reaches the producing well.

I claim as my invention:

1. A method for recovering petroleum oil from natural underground reservoirs comprising injecting through an input well and into a reservoir an aqueous solution of a water soluble surfactant in an amount sufficient to form a wide band of surfactant-containing fluid in the producing formation, injecting a slug of oil having a density and viscosity approximating that of said petroleum behind said solution in an amount sufficient to form a continuous, advancing oil front, injecting flood water after said oil slug, and recovering oil from said reservoir through a producing well.

2. Method in accordance with claim 1 in which the minimum amount of aqueous surfactant solution required to be injected is determined experimentally by water and oil saturation of formation cores.

3. Method in accordance with claim 2 in which the minimum amount of aqueous surfactant solution is between 0.2 and 0.3 pore volume of the producing formation.

4. Method in accordance with claim 3 in which the oil slug amounts to about 0.01–0.10 pore volume.

5. Method in accordance with claim 4 in which the aqueous solution contains about 0.01–1.0% by weight of surfactant.

6. Method in accordance with claim 1 in which aqueous surfactant solution is injected until the solution is produced at a producing well.

7. A method for recovering petroleum oil from natural underground reservoirs comprising injecting through an input well and into said reservoir an aqueous solution of a water soluble surfactant containing about 0.01 weight percent of perfluorobutyric acid, thereafter injecting about 0.05 pore volume of crude oil, injecting flood water after said crude oil, and recovering oil from said reservoir through a producing well.

References Cited in the file of this patent

UNITED STATES PATENTS

| | | |
|---|---|---|
| 2,669,306 | Teter et al. | Feb. 16, 1954 |
| 2,800,962 | Garst | July 30, 1957 |
| 2,812,817 | Sayre | Nov. 12, 1957 |